Jan. 23, 1951  G. M. SHUMAKER  2,539,038
NAIL TIE
Filed Oct. 25, 1946
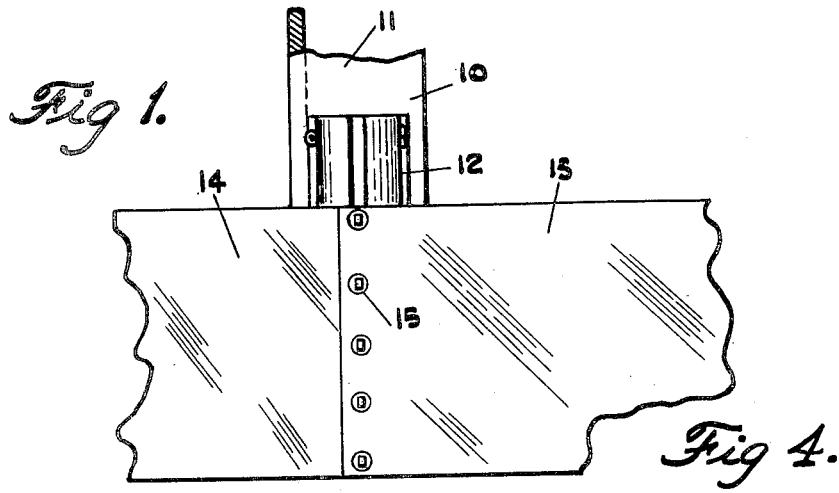
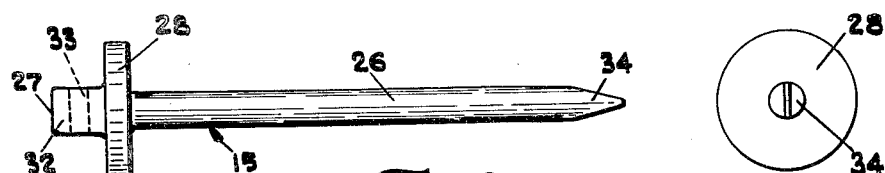
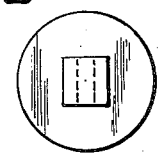
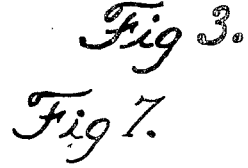
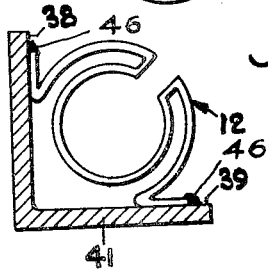
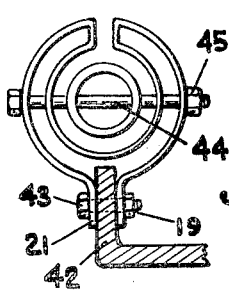
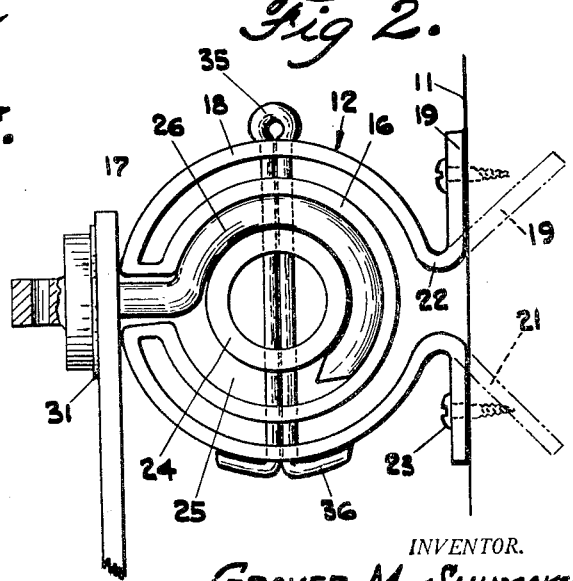
INVENTOR.
GROVER M. SHUMAKER
BY Patented Jan. 23, 1951

2,539,038

UNITED STATES PATENT OFFICE 2,539,038

NAIL TIE

Grover M. Shumaker, Euclid, Ohio

Application October 25, 1946, Serial No. 705,755

2 Claims. (Cl. 189—34)

This invention relates to nail ties adapted for the securement of metal plates upon a wall or ceiling beam or rafter.

It is an object of the present invention to provide a tie channel which is so constructed that it will be adapted for attachment to any number of different wall or beam-supporting portions.

It is another object of the invention to provide in a nail tie channel means for preventing the axial displacement of the nails once they have been struck home in the channel whereby to prevent slippage of the attached plates along the channel.

It is another object of the invention to provide a tie channel that will allow the securement by nailing to the channel any kind of material such as plywood, lumber, insulating sheets, and so forth.

It is another object of the invention to provide a tie channel which may take a standard nail of proper diameter and length to fasten and securely hold sheet metal or other materials to the channel.

It is another object of the invention to provide a nail which can easily adapt itself to the round passage in the channel when driven thereinto and which is provided with a flange for retaining an asbestos plate around the nail opening and which has a head provided with means for insertion of a screw driver or other tool for breaking the head from the shank at times when it is desired to remove the metal sheets from the channel.

For other objects and a better understanding of the invention, reference may be had to the following detailed description taken in connection with the accompanying drawings, in which:

Figure 1 is a front view looking upon two plates which have been assembled by nail ties to a vertically extending channel carried on a wall element.

Figure 2 is an end view looking down upon the end of a channel and upon the top edge of the plate and showing the position of the nail which has been forced into the channel for the securement of the plate.

Figures 3 and 4 are respectively side elevational and bottom end views of the nail tie or spike while still in its straight and unused condition.

Figure 5 is an end elevational view showing the channel which has been adapted for securement into a corner.

Figure 6 is an end elevational view of a channel wherein its attaching portions have been bent outwardly for securing the channel to opposite side faces of a vertically extending flange and with a rod connected therein by a transversely extending bolt and nut means.

Figure 7 is a top plan view of the nail head.

Referring now to the drawings, 10 represents a vertically extending angle portion having a front face 11 adapted for the attachment thereto of a nail tie channel 12 to which overlapped plates 13 and 14 are attached by tie nails 15. The channel 12, as shown in Figure 2, has an internal cylindrical portion 16 open at its front face to provide a nail-receiving slot 17 and from points adjacent these slot portions the channel metal is bent back about the exterior of the cylinder portion 16 and radially spaced therefrom as indicated at 18. The ends of the portions 18 terminate with folded back or flared attaching portions 19 and 21. These attaching portions 19 and 21 can be bent from a point 22 to assume any angular position which will adapt the portions for attachment to the particular surface on which the nail tie channel is to be attached. In the instance shown in Figure 1, the surface for receiving the attaching portions is flat, hence the attaching portions are bent to the positions shown in Figure 2. Screws 23 are used for attaching the channel to the surface 11. In lieu of such screws and in case the vertically extending angle portion is made of metal, machine bolts may be used, or the channel can be welded to fasten it to the angle portion.

Within the cylindrical portion 16 there is disposed a central hollow rod 24 concentrically arranged with respect to the cylinder portion 16 and radially spaced to provide an annularly shaped chamber 25 for receiving a shank 26 of nail 15. The nail 15 has a flanged head end 27 from which the shank 26 extends. This head portion 27 has a radially outwardly extending flange 28 adapted to retain an asbestos washer 31 for sealing off the nail opening in the metal sheet. Above the flange 28 is a portion 32 having a transverse hole 33 which serves, when the nails are to be severed from the channel and the metal sheets removed therefrom, for the engagement of a screw driver or other tool by which twisting of the nail shank can be effected to break the head therefrom. In lieu of the special nail 15, a regular or standard nail can be used providing it is of the proper diameter and length.

To connect the metal plate to the channel, the nail shank is passed through the metal plate and into the slot 17 of the channel. As the flattened point 34 engages the outer surface of the rod 24, it is diverted into the space 25 within the cylinder 16 and is caused to be bent and assume the shape thereof. The head 34 will pass around the rod 24 more than 180° so as to provide a hook portion by which the nail will be positively retained in the channel. In order to keep the rod 24 and the nails 15 from sliding vertically in the channel, there is provided a cotter pin 35 which is passed transversely therethrough and its ends severed and turned over, as indicated at 36.

Referring now to Figure 5, there is shown a channel with its attaching portions 19 and 21 bent about the point 22 to have an acute angle with the portions 18 so as to lie flush upon angle faces 38 and 39 of an angle member 41 forming a corner for the reception of the channel 12. The rod 24 and the cotter pins 35 may be attached to this channel in the same manner that they are attached to the channel, as shown in Figure 2.

Referring now to Figure 6, the attaching portions 19 and 21 are bent in the opposite direction so as to be parallel with one another and to be attached respectively to opposite faces of a vertically extending flange 42. The usual screws 23 or bolts 43 may be used for the securement of the attaching portion to the member 42, or they can be welded. Instead of using a cotter pin 35, a bolt 44 can be extended through the channel and retained therein by nuts 45.

The tie channel, when applied to structural shapes, is usualy welded thereto, but in some cases may be bolted or screwed. This welding for connection of the channel to the angle portion is indicated at 46.

Having now described my invention, I claim:

1. A nail tie comprising an inner cylinder having a longitudinal slot upon its side, outer cylindrically curved portions secured to the inner cylinder adjacent to the slot and leaving the slot uncovered, the cylindrically curved portions forming an outer cylinder concentric with the inner cylinder and enclosing the major portion of the same, the free ends of the cylindrically curved portions being arranged near each other and opposite the slot and having bendable attaching extensions extending to the exterior thereof and which may be arranged at different angles with relation to such portions, a tube arranged within the inner cylinder and having a longitudinally straight periphery, all portions of the periphery being disposed in spaced concentric relation with the inner cylinder, a nail having a shank extending through the slot, said shank having an inner cylindrically curved portion encircling the inner tube and a securing element extending through the outer curved portions, the inner cylinder and the tube connecting the latter together.

2. A nail tie comprising an inner tubular cylinder having a longitudinal slot upon its side, outer cylindrically curved portions secured to the inner tubular cylinder adjacent to the slot and leaving the slot uncovered, the cylindrically curved portions forming an outer cylinder concentric with the inner tubular cylinder and spaced therefrom and enclosing the major portion of the same, the free ends of the cylindrically curved portions being spaced and arranged near each other and disposed opposite the slot and having outwardly projecting extensions extending beyond such ends, the extensions being disposed at a right angle to the radius passing through the slot, a tube arranged within the inner tubular cylinder and having a longitudinally straight periphery, all portions of the periphery being disposed in spaced concentric relation with the inner tubular cylinder, a nail having a shank extending through the slot, said shank having an inner cylindrically curved portion encircling the inner tube, and a pin passing through the outer cylindrically curved portions, the inner tubular cylinder, and the tube connecting these elements.

GROVER M. SHUMAKER.

REFERENCES CITED

The following references are of record in the file of this patent:

UNITED STATES PATENTS

| Number | Name | Date |
| --- | --- | --- |
| 1,543,035 | Strid | June 23, 1925 |
| 1,592,495 | Lorenz | July 13, 1926 |
| 2,091,875 | Oesterling | Aug. 31, 1937 |
| 2,160,794 | Price | May 30, 1939 |
| 2,171,540 | Calkins et al. | Sept. 5, 1939 |
| 2,237,741 | Lindsley | Apr. 8, 1941 |